Sept. 15, 1942.   J. H. MELVILLE ET AL   2,295,959
AMPERE DEMAND METER
Filed Aug. 28, 1939   5 Sheets-Sheet 1

ACTUATING BIMETALLIC SPRING ELEMENT   COMPENSATING BIMETALLIC SPRING ELEMENT

Inventors
JAMES H. MELVILLE,
RICHARD HOELLER,
By Bailey & Carson
Attorneys

Inventors
JAMES H. MELVILLE,
RICHARD HOELLER,

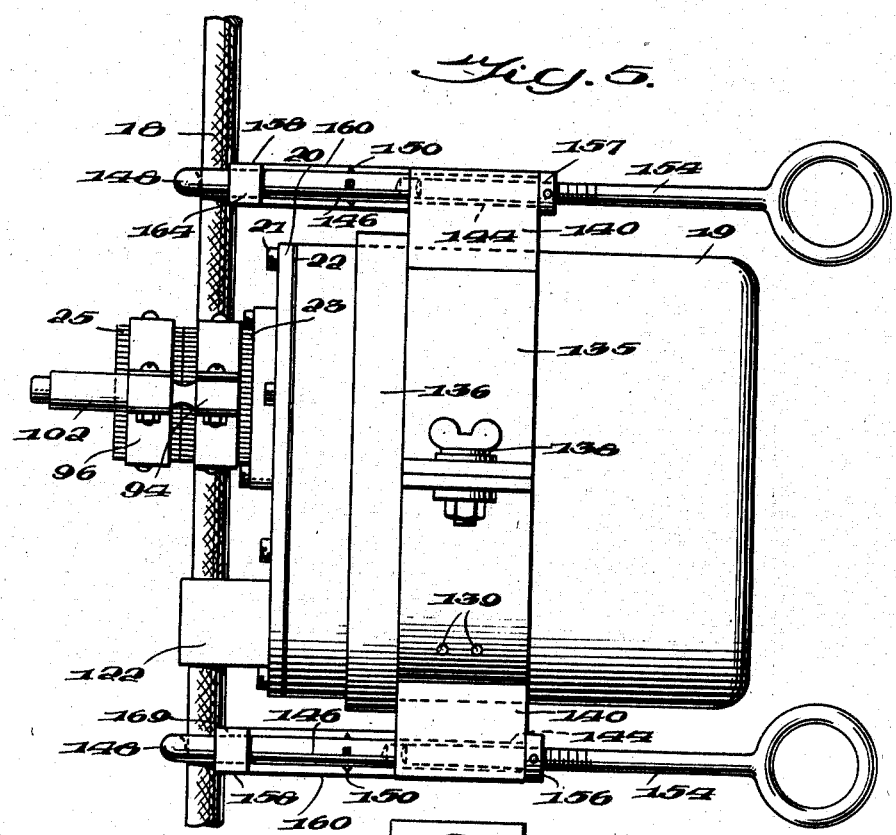

Sept. 15, 1942.   J. H. MELVILLE ET AL   2,295,959
AMPERE DEMAND METER
Filed Aug. 28, 1939   5 Sheets-Sheet 4
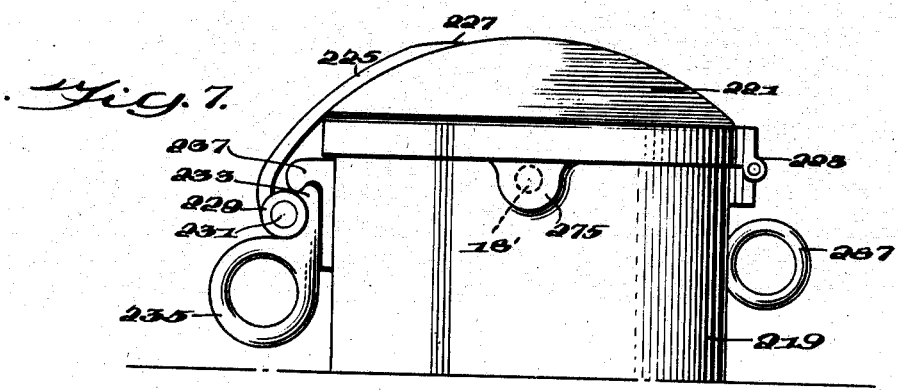
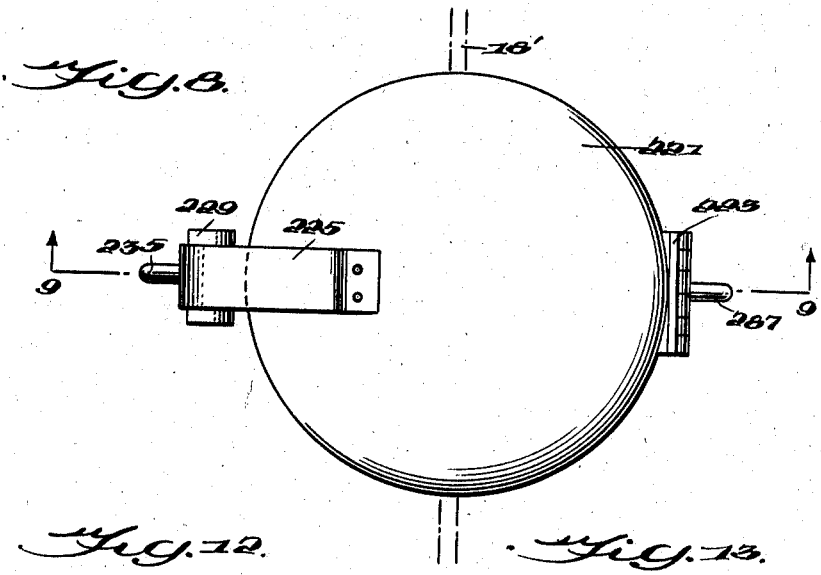
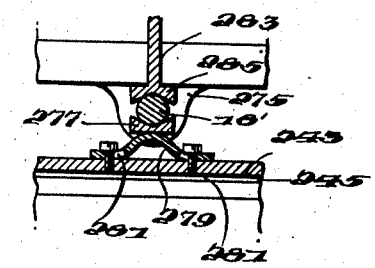
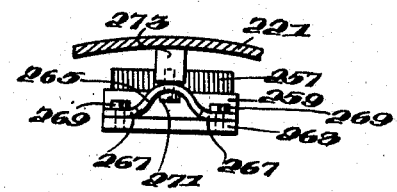
Inventors
JAMES H. MELVILLE,
RICHARD HOELLER,
By Bailey & Rivers
Attorneys Sept. 15, 1942.    J. H. MELVILLE ET AL    2,295,959
AMPERE DEMAND METER
Filed Aug. 28, 1939    5 Sheets-Sheet 5
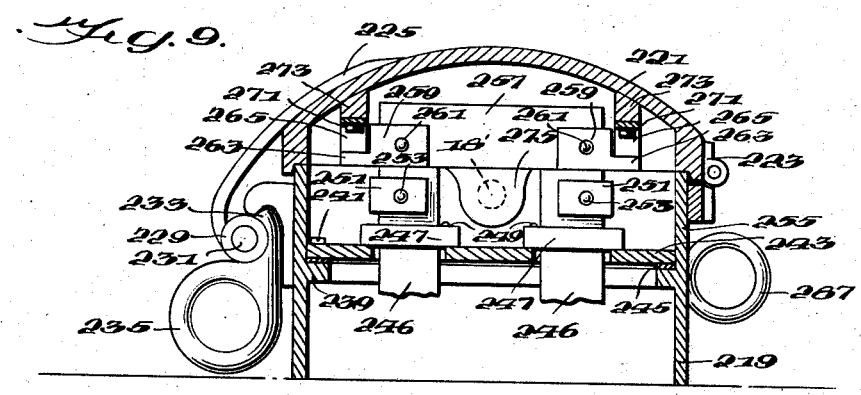
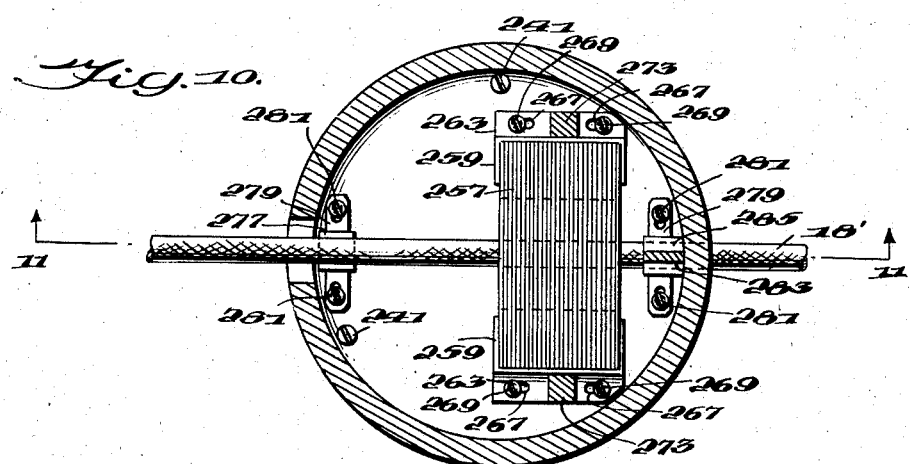
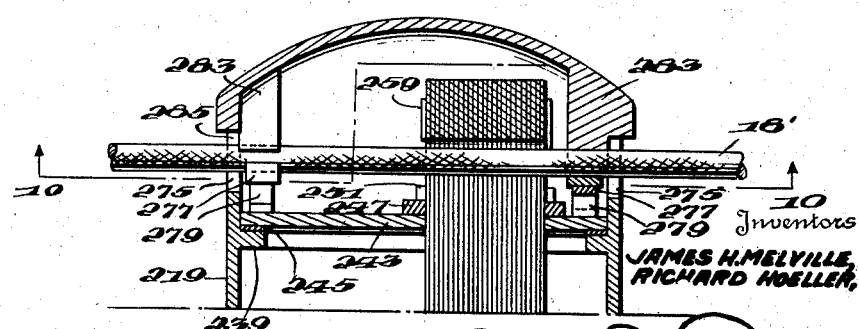
Inventors
JAMES H. MELVILLE,
RICHARD HOELLER,
By Bailey & Parsons
Attorneys Patented Sept. 15, 1942

2,295,959

UNITED STATES PATENT OFFICE 2,295,959

AMPERE DEMAND METER

James H. Melville and Richard Hoeller, Miami, Fla.

Application August 28, 1939, Serial No. 292,344

12 Claims. (Cl. 171—95)

This invention relates to ampere demand meters of the type ordinarily used for indications of maximum current flow in electric distribution and transmission lines for power and lighting.

Particularly, the invention concerns meters especially adapted to be installed on a power line easily and safely, and which will be durable, accurate, consistent and resistant to the natural elements to which they are subjected.

In areas serviced by power companies, individual transmission lines are subjected to local peak loads during certain times of the day. The current flowing in such lines may be measured by a meter embodying the present invention by temporary installation at successive points along the line. It is intended that this meter be light in weight, requiring no additional supporting means, even on lines of low tensile strength. Universal adaptability to either high or low potential lines is also an object.

Since some installations must be made during windy weather, it is intended that the entire unit be light in weight and of small overall dimensions to prevent undue strain on the line.

It is further intended to provide line-engaging means for holding the meter, and especially the magnetic pick-up portion thereof, in proper relationship to the line, which makes for accurate and consistent measurement.

It is also intended to provide means for holding a section of a power line taut so that it will be in properly spaced relation to the magnetic pick-up portion of the meter.

Another object is to encase the entire unit, including the line-engaging means.

With safety as one of the prime objects, it is intended to provide a meter which may be applied to, or used adjacent high potential lines without danger to the linesman and without danger of short circuits from adjacent conductors.

Also, it is proposed to provide a meter easily operable in overhead position.

These and other broad objectives, as well as others to which the specific, individual elements are devoted, are attained by the invention described in the following specification and drawings, in which:

Fig. 5 is a side elevation showing a modification of the line-engaging apparatus;

Fig. 6 is a plan view of the modification shown in Fig. 5;

Fig. 7 is a side elevation of a second modification;

Fig. 8 is a plan view of the device shown in Fig. 7;

Fig. 9 is a vertical section along the line 9—9 of Fig. 8;

Fig. 10 is a transverse section along the lnes 10—10 of Fig. 11;

Fig. 11 is a vertical section along the lines 11—11 of Fig. 10; and

Figs. 12 and 13 are fragment views of specific details of parts of Figs. 9 to 11.

Figs. 1 to 4 show the new meter attached to transmission line 18. The mechanism is enclosed in a casing 19, which may be of metal, and a lid 20, preferably formed of insulating material, is secured to the open end thereof by means of screws 21. A gasket 22 forms a seal between the lid and the casing.

Figure 3:
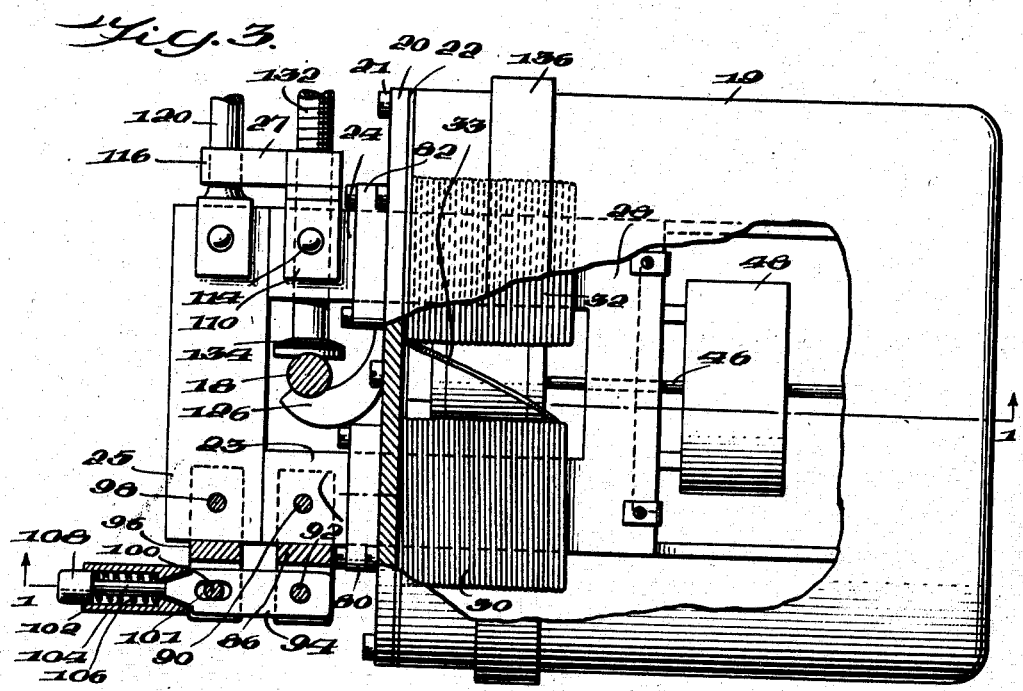
Fig. 3 is a plan view with the casing partially broken away.

Protruding through openings in lid 20 are legs 23 and 24 of a split core transformer, which has a transverse outer end section 25, one end of which is pivoted to leg 23 of the transformer in a manner to be described with particular reference to Fig. 3. The other end of end section 25 is held against leg 24 by a catch member 27, as also shown best in Fig. 3. Thus, the transformer core comprises line-surrounding, electromagnetic current pick-up means.

At the inner end of legs 23 and 24 of the transformer there is an inner end section 28 and intermediate the inner and outer end sections are induction windings 30 and 32 connected in series, as at 33, and having end leads 34 and 36, each connected to one terminal 38 and 40, respectively, of heater elements (not shown), the other terminals of which are, in turn, connected by lead 42 to complete the electrical circuit.

A bimetallic spring, the casing of which is indicated at 44, has one end connected to shaft 46 and the other end to casing 44 so that when the magnetic field set up by current flowing through power line 18 permeates the core of the transformer magnetic lines of force expand and collapse across windings 30 and 32 to induce a flow of current therein, and through leads 34 and 36 to the heater elements which cause the bimetallic spring to exert torque on shaft 46.

In the manner well known in the art, a second bimetallic spring, encased as at 48, is applied to shaft 46 in opposition to the first spring to compensate for heat from external sources.

Mounted on shaft 46, a pointer 50 rotates therewith and, through pusher 52, drives the free pointer 54 and leaves it at the position of greatest advance, thus indicating the maximum current flow on dial 56, which may be read through window 58.

An adjustable tension spring 60 is connected adjacent the end of shaft 46, and may be adjusted for calibrating the meter to various current ranges by rotation of arm 62 connected to the end of spring 60 and to gear 64 which is held by pinion 66, whose shaft is, in turn, held by set screw 70.

It should be noted that the inside of the meter unit is supported on a frame 73, which, by bracket arms 74, is secured to the transformer, as shown at 75.

Figure 1:
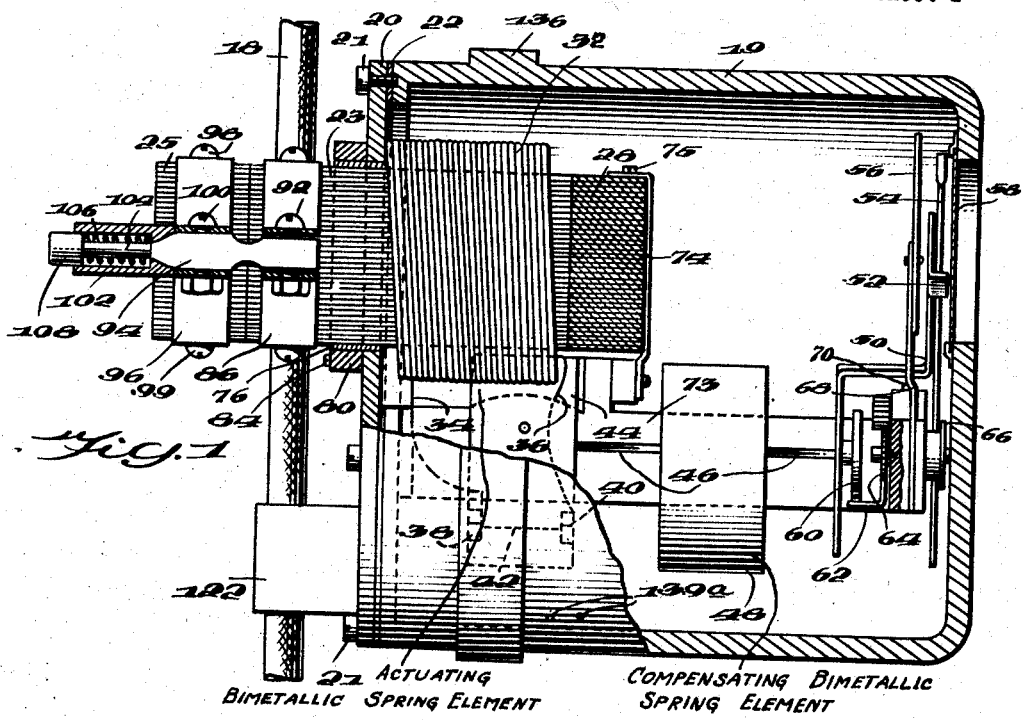
Fig. 1 is a side elevation of the meter, with the casing partially broken away and in irregular section along the lines 1—1 of Fig. 3, as applied to a power line.
Figure 2:
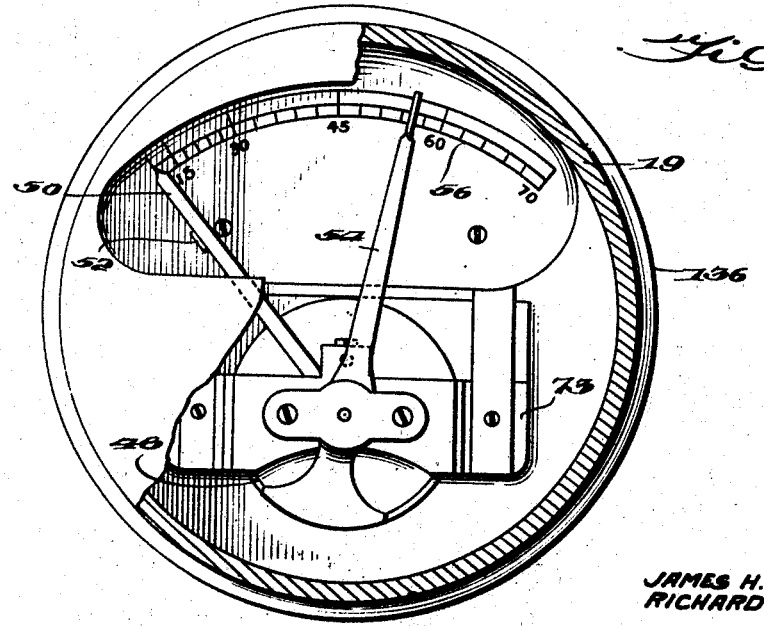
Fig. 2 is a front end elevation of the meter with part of the casing broken away.

Reverting to the electro-magnetic pick-up means which protrude outwardly of the casing, it is apparent from Figs. 1 and 3 that transformer legs 23 and 24 are surrounded by insulating gaskets 76 where they pass through the openings in the casing top 20. Bosses 80 and 82, which are secured by screws 84, lend additional support to the protruding legs of the transformer and aid in sealing the instrument from moisture.

Referring particularly to Figs. 1 and 3, the pivotal attachment, hitherto referred to, of the outer transverse end 25 of the transformer to protruding leg 23 is accomplished in the following manner.

A bracket 86 is gripped on protruding leg 23, and held by pin 90 which passes through the core leg. Gudgeon bolt 92 holds a link 94 between the free ends of the bracket 86. A similar arrangement is provided at the end of the transverse end piece 25 of the core wherein a bracket 96 is held by pin 98 to the core and by gudgeon bolt 100 to link 94.

The opening through link 94 for gudgeon bolt 100 is elongated, as shown at 101, bolt 100 normally being about midway of the length of the opening when the outer transverse end 25 of the core is closed against the ends of the legs 23 and 24.

A sleeve 102 surrounds the extension 104 of link 94, and, in turn, is pressed downwardly against bracket 96 by spring 106 so that there is always a tendency for the outer transverse end 25 of the core to hold open sufficiently for installation over a power line. The upper end of spring 106 abuts against cap 108, which is threaded to the free end of the extension 104 of link 94.

On leg 24 of the transformer core a bracket 110 is secured by pin 114 and is rigidly connected with outwardly extending spring jaw members 116 and 118 which engage the shank of an eye bolt 120, the end of which is attached by a bracket and pin arrangement to the free end of the transverse end piece 25 of the transformer core. When the transverse end piece 25 is closed against legs 23 and 24, there is always a positive pressure exerted by spring 106 tending to press the end piece in flat engagement with the flat ends of the core.

Figure 4:
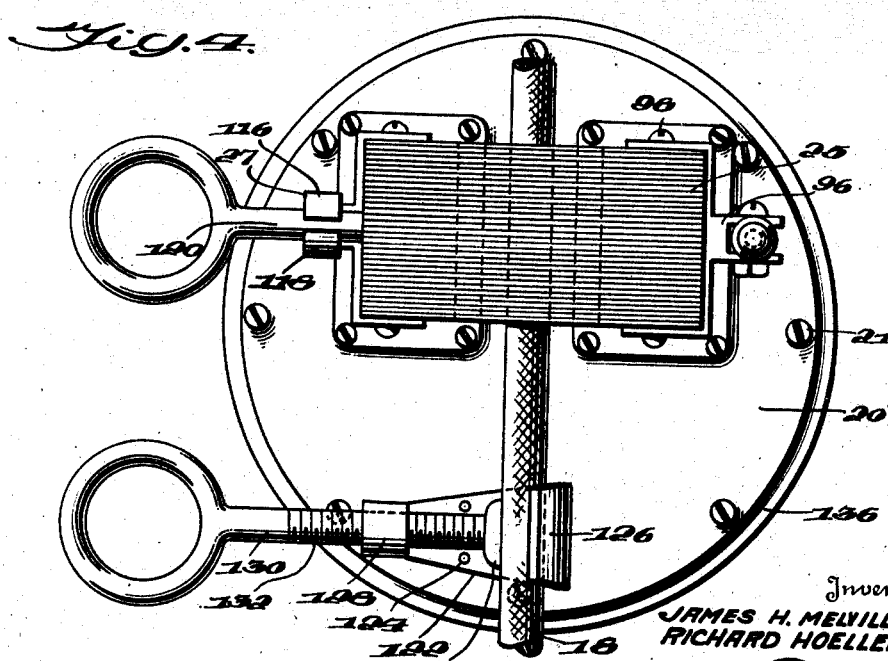
Fig. 4 is a rear end elevation.

Fig. 4 shows that the transformer is held on transmission line 18 by means of a clamp 122, the base of which is secured to casing lid 20 by screws 124. The clamp has an upstanding fixed jaw 126 at one end, and an internally threaded sleeve 128 at the other end. An eye bolt 130 having a threaded shank 132 threadedly engaged through the internally threaded sleeve 128 carries a shoe 134 for engaging line 18 tightly between the shoe and fixed jaw 126.

In operation, the end section 25 of the transformer core is swung to an open position and, after the meter is placed on a line, eye bolt 130 is tightened to grip the line between jaw 126 and shoe 134. By means of eye bolt 120, the end section 25 of the transformer is swung closed with the shank of eye bolt 120 engaged in catch 27.

In operative position, the transformer core frames the power line. Clamp 122 holds the entire meter in fixed relationship with the line so that the transformer core never contacts the power line and so that substantially the same spaced relationship always obtains between the core elements and the line, thus to provide uniform, accurate readings on the meter dial.

Eye bolts 120 and 130 are provided as safety measures so that the meter may be operated by suitably formed "hot sticks" when being installed on, or removed from, or adjacent high tension lines.

Figs. 5 and 6 show wire clamping means for use where the rigidity of the power line is insufficient for proper, rigid support of the meter, and also to combat excessive swinging or dislodgment because of adverse wind conditions.

A detachable band 135 is slipped over casing 19 to engage against collar 136 which is formed by an outwardly extending part of the casing wall, after which band 135 is tightened by the wing bolt and nut 138. Pins 139 are provided on the inner side of the band for engagement in the socket holes 139a (Fig. 1) in the casing 19 to locate and lock the band circumferentially.

Within opposed loops 140, 140, band 135 carries blocks 142, 142, which are bored, as shown in dotted lines 144 in Fig. 5, slidably to support the shanks of J bolts 146, 146. The J bolts have curved ends 148, 148 for engaging over a transmission line, stop members 150, 150 and hollow, internally threaded, female shank ends 152, 152. Eye bolts 154, 154, having male threaded shank ends 156, 156 are threadedly engaged in the female ends of the J bolts, and the eye bolts are provided with stop collars 157, 157 for limiting movement through the collars. The J clamp assemblies are completed by the fixed jaws 158, 158 on the ends of arms 160, 160, which are secured by screws 162 to the blocks 142, 142. Fixed jaws 158, 158 are split, as shown by lines 164 in Fig. 5, to allow the J bolts to pass therethrough and so that when stops 150 engage the back sides of the fixed jaws, the J bolts will be prevented from falling away from blocks 142.

After clamp 122, hinged end section 25 of the transformer and the J clamps are opened, the assembly is mounted on line 18 by closing the clamps and end section. The clamps not only hold the meter rigidly to the line, but also hold the line taut so that uniform spacing is provided between the line and the transformer sections. If necessary, clamp 122 may be tightened first, and the meter slightly pulled to provide extra tautness on line 18 so that when the J clamps are tightened the line between the J clamps will be more rigid than the line on either side of the meter.

It should be noted that all of the clamping members may be easily manipulated by "hot sticks." Where installations must be made on or near high tension lines, or from remote positions, a suitably formed clamp stick may be applied around the casing of the meter.

In the modification shown in Figs. 7 to 13, inclusive, the meter casing 219, which is preferably formed of insulating material, is provided with an internal mechanism similar to that shown in Figs. 1 and 3. The modification, however, includes cap means for substantially enclosing, holding and protecting the line-engaging means and the transformer sections.

Referring first to Figs. 7 and 8, the elliptical cap 221, preferably formed of insulating material, is hinged, as at 223, to casing 219. A spring arm 225 is bolted at one end 227 to the elliptical cap and, at the other end, carries a bearing 229 for the pintle 231 which, in turn, carries a cam latch 233. The cam 233 may be operated by the eye piece 235 to engage a complementary hook 237 rigid with casing 219 to hold cap 221 closed.

The sectional views show that casing 219 is provided with an internal flange 239 to which, by screws 241, the lid 243 is secured with a gasket 245 therebetween.

Legs 246, 246 of a split core transformer, as previously described, extend upwardly through openings in lid 243. Insulating gasket bosses 247, 247, which hold the transformer core legs against wobbling relative to the lid 243, are secured tightly around the core legs and fastened to the lid by screws, as shown at 249, and the core laminations at the outer ends of the legs are embraced by bracket strips 251, 251, secured thereto by pins 253, 253.

It should be noted that casing 219 extends substantially above the lid 243 to provide an apron portion 255 which cooperates with cap 221 to provide a substantially complete enclosure of the wire-engaging apparatus.

Carried by the cap 221, the laminations which form the transverse end piece 257 of the transformer core are embraced by brackets 259, 259 which are held thereto by pins 261 engaged through the end piece 257. Brackets 259, 259 each have a laterally extending foot portion 263.

The resilient suspension of each end of the transverse end piece 257 of the transformer core from the cap 221 is best illustrated in detail by Fig. 13, wherein it is shown that a spring yoke 265 slotted, as at 267, 267, is slidably secured, in each instance, to the laterally extending foot portion 263 of bracket 259 by screws 269, 269, which pass through slots 267, 267. Each of yokes 265 is hung by screws 271, 271 to a stud 273 which extends downwardly from the inner side of cap 221, as shown in Figs. 9 to 11.

Thus, when cap 221 is closed, the transverse end piece 257 of the transformer core is resiliently pressed against the ends of core legs 246, 246 to form a tight mechanical and electro-magnetic engagement. Laterally opposed, downwardly curved notches 275, 275 are provided in the top edge of the apron portion 255 of casing 219 for accommodating a power line 18' over which the meter is locked by cap 221. The sides of notches 275, 275 are curved for guiding the line into line-engaging, V-shaped shoes 277, 277, which, by spring yokes 279, 279, are resiliently supported on lid 243 adjacent each notch 275 by the slot screw arrangement 281, 281, best shown in the fragmentary section Fig. 12.

Downwardly projecting studs 283, 283, which are rigid with cap 221, each carry a V-shaped shoe 285, 285 at their lower ends to cooperate with shoes 277, 277 for tightly engaging line 18'.

An eye handle 287 is mounted on casing 219 so that with the cap open the meter may be hooked by a "hot stick" and seated beneath a power line 18'. When the cap is locked, closed by manipulating the eye piece 235, the meter is tightly engaged over the line which, by shoes 277, 277 and 285, 285, is tightly held in spaced relationship to the core pieces 246, 246, 257 of the transformer.

This invention having hereabove been described is not to be limited to the specific embodiments thereof, but only by the scope of the following claims.

We claim:

1. In a device for measuring an electrical quantity in an electric power transmission line relatively stiff in use, including a casing; a pair of members supported on said casing and responsive to the electro-magnetic currents in said line, said members being spaced from one another to allow the transmission line to pass therebetween along one axis and clamp means on said device opposite the space between said members and spaced therefrom along said axis for supporting said casing on said line and for holding said line between said members.

2. In a maximum demand meter for measuring the peak load in an electric power transmission line, including a casing, a maximum demand meter unit enclosed in said casing; current pick-up means comprising a split-core transformer mounted in said casing having legs projecting outwardly beyond the casing wall, said legs being spaced from one another for allowing the transmission line to extend therethrough along one axis, and clamp means on said casing for supporting said casing on said line and for holding said sections of the transformer in spaced relationship with said line, said clamp means being spaced along said axis from the space between said legs.

3. In combination with an electric meter having a casing and electro-magnetic current pick-up means supported by said casing and adapted to be held in spaced relationship with a transmission line; a band tightly engageable with said casing, means on said band and said casing for fixing the relative positions thereof, a spaced pair of clamps carried by said band, one on each side of said casing and adapted to be engaged with said line for holding said casing and said means in fixed relationship with the line between the clamps.

4. An ampere demand meter, including a casing body, electric current pick-up means extending outwardly of said body at one end thereof adapted to be exposed to the electric current in a power transmission line, a removable cap, means on said cap engageable with the first-mentioned end and substantially covering said means when said cap is closed on said casing, and cooperating means on said cap and said body for releasably engaging said line therebetween for supporting said meter on said line.

5. An ampere demand meter for measuring electric current in an electric power transmission line, comprising a casing body, a meter unit in said casing body, electro-magnetic pick-up means at one end of the body, the output of said means being connected to said meter, a cap, means removably mounting said cap on said one end of said body, a second electro-magnetic pick-up means in said cap and cooperating with the first-named means when said cap is in closed condition, and cooperating means on said body and cap for engaging a line therebetween when said cap is closed for supporting said casing on the line.

6. An electric meter for measuring the current in an electric power transmission line, including a casing body, electro-magnetic current pick-up means at an end of said body adapted to be held in spaced relationship with said line, a cap removably engageable with said end, said cap substantially covering said means when engaged with said end, cooperating electro-magnetic pick-up means carried by said cap and adapted to engage the first-named means when said cap and body are engaged, and line-engaging means on said cap and body for engaging said line therebetween whereby to support said casing on said line, said line-engaging means being adapted and arranged, with respect to said cap, casing and current pick-up means, to hold at least a portion of said current pick-up means in spaced relationship to said line.

7. An ampere demand meter, including a casing body having a lid set inwardly from one end thereof, a transformer core supported in said body and protruding through said lid, at least one line-engaging jaw supported on said body, the line-engaging portion of said jaw extending relative to said lid beyond said core, a cap engageable with said body over at least a portion of the end extending beyond said lid whereby to cover said transformer when said cap is in closed position, and a cooperating line engaging jaw carried by said cap whereby, when said cap is engaged with said casing with said line therebetween, said casing is supported with said transformer core in fixed relationship with the line.

8. An ampere demand meter as claimed in claim 7, the end of said casing beyond said lid having two opposed notches extending inwardly from the edge thereof in alignment with said jaws whereby to accommodate said line and for guiding the same to the first-mentioned jaw during installation of the meter.

9. An ampere demand meter comprising a casing having a meter unit therein, electromagnetic current pick-up means comprising a split-core transformer electrically connected to said meter unit, the free ends of said core extending outwardly beyond one end of said casing, a cap pivoted to said end, a transverse end piece for said transformer core carried in said cap opposite the ends of said legs and adapted to engage tightly thereagainst when said cap is closed, and passage means between said cap and casing for allowing said cap to be closed over a power transmission line, said passage means being aligned with the space circumscribed by the transformer core when said cap is closed.

10. An ampere demand meter as claimed in claim 9, and line-engaging jaws carried by said casing and said cap, the line-engaging portions thereof being aligned with said passage means and said space.

11. An ampere demand meter comprising a substantially tubular casing having a meter unit therein, said casing having a lid set inwardly from one end thereof, a substantially U-shaped split-core transformer electrically connected to said unit, the free ends of the legs of said core extending outwardly through said lid, a cap pivoted to said end portion, a transverse end piece for said transformer core resiliently carried in said cap opposite the ends of said legs and adapted to be resiliently engaged against said ends when said cap is closed, resilient means for supporting said piece in said lid, a pair of circumferentially opposed notched passage means in the edge of said casing beyond said lid and laterally opposite, respectively, the space circumscribed by said transformer core, a pair of circumferentially opposed line-engaging shoes resiliently mounted on said lid in alignment with said passage means, and cooperating line-engaging shoes supported in said cap cooperating with the first-named shoes to hold said line when said cap is closed.

12. An ampere demand meter as claimed in claim 11, said resilient means comprising a pair of downwardly extending spring yokes attached at their centers, respectively, to support members rigid with the wall of said cap, and connecting means rigid with said transverse end piece slidably engaged, respectively, with the ends of said spring yokes.

JAMES H. MELVILLE.
RICHARD HOELLER.